Patented Feb. 9, 1943

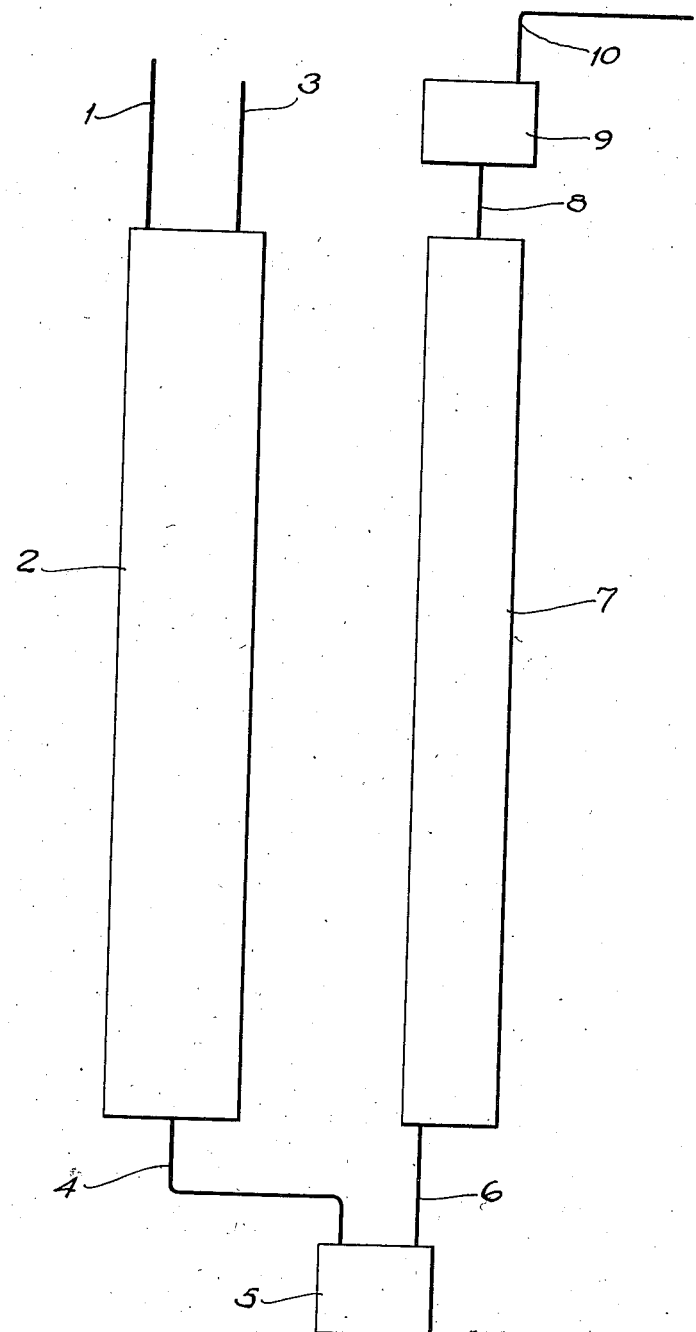

2,310,478

UNITED STATES PATENT OFFICE 2,310,478

PROCESS FOR THE TREATMENT OF METHYLAMINES

William Tyerman, Norton-on-Tees, England, assignor to Imperial Chemical Industries Limited, a corporation of Great Britain Application July 15, 1940, Serial No. 345,667
In Great Britain July 19, 1939

4 Claims. (Cl. 260—585)

This invention relates to the manufacture of mono- and dimethyl formamides from methyl formate and mono- and dimethylamines.

Mono- and dimethylamines made by known processes are usually accompanied by trimethylamine, which is difficult to separate from the other amines. If mixtures containing mono-, di- and trimethylamines are treated with methyl formate, the trimethylamine remains unchanged and difficulty is experienced in recovering residual methyl formate from it for further use in the process.

One object of the present invention is to provide a process of reacting a mixture of methylamines with methyl formate in such a manner that the methyl formate is substantially completely converted into mono- and dimethyl formamides. Another object is to provide a process of reacting a mixture of methylamines containing ammonia, with methyl formate in such a manner as to obtain mono- and dimethyl formamides without any substantial amount of formamide itself. Other objects will appear hereinafter.

I have found that the above objects can be achieved by treating mixtures containing mono-, di- and trimethylamines with methyl formate in an amount less than that stoichiometrically equivalent to the mono- and dimethylamines. The methyl formate is thereby converted substantially completely into mono- and dimethyl formamides and the unchanged trimethylamine merely contains some residual mono-methylamine and a smaller amount of dimethylamine.

The mono- and dimethyl formamides may be obtained in a pure state by first separating them from the trimethylamine and unreacted mono- and dimethylamines by cooling, and then subjecting the condensate to fractional distillation.

The method of the present invention is particularly valuable in preparing mono- and dimethyl formamides from mixtures of the methylamines which have been obtained by the interaction of ammonia and methanol. Although such mixtures of methylamines usually contain considerable quantities of residual ammonia, I have found that by the method of the present invention the methyl formate reacts almost exclusively with the mono- and dimethylamines and a product practically free from formamide is obtained.

The present invention further includes the preparation of mono- and dimethyl formamides by reacting ammonia and methanol, treating the resulting mixture of methylamines and ammonia with methyl formate in amount insufficient to react with all the mono- and dimethylamines, separating the unchanged methylamines and ammonia from the resulting mono- and dimethyl formamides and returning them, wholly or in part, to the first stage of the process so as to reduce the formation of trimethylamine.

A convenient method of treating a mixture of mono-, di- and trimethylamines with methyl formate to produce mono- and dimethyl formamides will now be described with reference to the accompanying diagrammatic drawing.

A gaseous mixture of mono-, di- and trimethylamines is passed through pipe 1 into a reaction vessel 2, filled with glass beads or charcoal, and heated by a steam jacket to about 100° C. Methyl formate vapour in amount insufficient to react with all the mono- and dimethylamines is passed into the reaction vessel through pipe 3.

The reaction products, together with trimethylamine and unconverted methyl formate and mono- and dimethylamines pass from the reaction vessel 2 through pipe 4 into a catchpot 5 maintained at a temperature of about 50° C. where the mono- and dimethyl formamides condense out, together with some of the methanol produced by the reaction. The residual vapour containing trimethylamine, unreacted mono- and dimethylamines and methyl formate and methanol, pass through pipe 6 into the bottom of an unheated reaction vessel 7, where the conversion of methyl formate into amides is completed.

Trimethylamine, together with unreacted mono- and dimethylamines and methanol produced by the reaction, passes out of the reaction vessel 7 through the pipe 8 into a condenser 9, where the methanol is condensed out and flows back down the reaction vessel 7 and pipe 6 into the catchpot 5 carrying with it the amides produced in the reaction vessel 7. The trimethylamine and unreacted mono- and dimethylamines leaving the condenser 9 by the pipe 10 are allowed to escape or may, if desired, be returned to the methylamine preparation stage to reduce the formation of trimethylamine.

The mixture of amides and methanol which collects in the catchpot 5 is fractionally distilled to produced pure mono-methyl formamide and pure dimethyl formamide, and the recovered methanol may be returned to the methylamine preparation stage.

The invention is illustrated, but not limited, by the following example.

Example

A mixture containing 197 gms. of ammonia, 140 gms. of monomethylamine, 139 gms. of dimethylamine and 487 gms. of trimethylamine, which had been produced by the catalytic treatment of methanol with ammonia at an elevated temperature, was passed with 338 gms. of methyl formate vapour (i. e., 74.1% of the amount theoretically required to convert the mono- and dimethylamines completely to amides) through a tube packed with glass ferrules and heated by a steam jacket to 100° C. The tube had an unpacked volume of 150 ccs. and each ferrule was approximately $\frac{1}{8}''$ internal diameter, $\frac{3}{16}''$ external diameter and $\frac{7}{32}''$ long.

The resulting mixture was passed from the reaction tube into a catchpot maintained at a temperature of about 50° C. where the mono- and dimethyl formamides condensed out. The residual vapour, containing trimethylamine, methanol and unreacted mono- and dimethylamines and methyl formate was passed from the catchpot, up an unheated packed tube identical in dimensions and packing with the steam jacket tube previously described. The vapour leaving the top of the tube was then passed through a condenser, and the methanol which condensed out was passed down the tube, and into the catchpot carrying with it any amides produced in the tube.

The liquid mixture was withdrawn from the catchpot and on fractional distillation yielded:

| | Grams |
|---|---|
| Dimethyl formamide (i. e., 92.5% conversion of the dimethylamine) | 208.5 |
| Mono-methyl formamide (i. e., 52.8% conversion of the monomethylamine) | 140.0 |
| Formamide (i. e., 3% conversion of the ammonia) | 16.0 |

The yields of the three amides were equivalent to 99.2% of the methyl formate used.

It will be noted that although ammonia was present in the reacting mixture in considerable quantity, 97% of it passed through unchanged, while substantially complete conversion of dimethylamine to dimethyl formamide was obtained.

The process of the present invention can be conveniently utilised as a step in the preparation of pure mono- and dimethylamines from mixtures containing them, by the herein described method of converting the mono- and dimethylamines into the mono- and dimethyl formamides respectively, and separating the formamides by distillation this step being followed by reconverting the pure formamides into the pure methylamines by hydrolysis.

As many widely different embodiments of this invention may be made without departing from the spirit or scope thereof, it is to be understood that I do not limit myself to the specific embodiments thereof, except as defined in the appended claims.

I claim:

1. A process for the separation of pure mono- and dimethylamines from mixtures containing them which comprises the steps of: (1) reacting a mixture of methylamines with a stoichiometrically inferior quantity of methyl formate; (2) separating the resulting formamides by distillation; and (3) thereafter reconverting the pure formamides into pure methylamines by hydrolysis.

2. A process for the separation of pure mono- and dimethylamines from mixtures containing them which comprises the steps of: (1) reacting a mixture containing mono-, di- and trimethylamines and ammonia with a quantity of methyl formate which is less than that stoichiometrically equivalent to the mono- and dimethylamines of said mixture; (2) separating the resultant formamides by distillation; and (3) thereafter reconverting the pure formamides into pure methylamines by hydrolysis.

3. A process for the production of mono- and dimethylamines which comprises reacting ammonia and methanol to obtain a mixture of methylamines containing ammonia, reacting the said mixture with a quantity of methyl formate less than that stoichiometrically equivalent to the mono- and dimethylamines of said mixture, to obtain a product comprising mono- and dimethyl formamides, methylamines and ammonia, separating the resultant formamides by distillation, returning the resultant methylamines and ammonia mixture, at least in part, to the ammonia-methanol reaction stage, and reconverting the pure formamides obtained by distillation into pure methylamines by hydrolysis.

4. A process for the separation of pure mono- and dimethylamines from mixtures containing them which comprises the steps of: (1) reacting a mixture containing mono-, di- and trimethylamines with a quantity of methyl formate which is less than that stoichiometrically equivalent to the mono- and dimethylamines of said mixture; (2) separating the resultant formamide by distillation; and (3) thereafter reconverting the pure formamides into pure methylamines by hydrolysis.

WILLIAM TYERMAN.